(12) United States Patent
Schwarz et al.

(10) Patent No.: US 12,444,137 B2
(45) Date of Patent: Oct. 14, 2025

(54) GENERATIVE TILE PATTERNING USING APERIODIC MONOTILES

(71) Applicant: TRIPP, Inc., Los Angeles, CA (US)

(72) Inventors: David Schwarz, Morrisville, NC (US); Nanea Reeves, Sherman Oaks, CA (US); Jason Lee Asbahr, Oakland, CA (US); Lia Tjiong, Los Angeles, CA (US)

(73) Assignee: Tripp, Inc., Los Angeles, CA (US)

( * ) Notice: Subject to any disclaimer, the term of this patent is extended or adjusted under 35 U.S.C. 154(b) by 274 days.

(21) Appl. No.: 18/449,677

(22) Filed: Aug. 14, 2023

(65) Prior Publication Data

US 2025/0061659 A1 Feb. 20, 2025

(51) Int. Cl.
*G06T 17/20* (2006.01)
*A63F 13/52* (2014.01)

(52) U.S. Cl.
CPC .............. *G06T 17/20* (2013.01); *A63F 13/52* (2014.09)

(58) Field of Classification Search
None
See application file for complete search history.

(56) References Cited

U.S. PATENT DOCUMENTS

| | | | |
|---|---|---|---|
| 11,935,209 B1 * | 3/2024 | Barsky | G06T 15/20 |
| 2019/0019333 A1 * | 1/2019 | Kumar | G06T 15/405 |
| 2019/0043242 A1 * | 2/2019 | Risser | G06T 15/04 |
| 2020/0167995 A1 * | 5/2020 | Hare | G06F 3/04815 |
| 2021/0142547 A1 * | 5/2021 | Fessler, Jr. | A63F 13/35 |

OTHER PUBLICATIONS

Smith, David, Joseph Samuel Myers, Craig S. Kaplan, and Chaim Goodman-Strauss. "An aperiodic monotile." arXiv preprint arXiv:2303.10798 (2023).*
Maung, David. Tile-based Method for Procedural Content Generation. Diss. The Ohio State University, 2016.*
Smith, D. et al., "An aperiodic monotile," 3 pages, Mar. 20, 2023, [Online] [Retrieved on Sep. 6, 2023] Retrieved from the Internet <URL: https://cs.uwaterloo.ca/~csk/hat/>.

* cited by examiner

*Primary Examiner* — Sultana M Zalalee
(74) *Attorney, Agent, or Firm* — Fenwick & West, LLP

(57) ABSTRACT

A media server generates a pattern using an irregular polygon. A generative model is applied to the irregular polygon to determine padding values at seams between contacting polygons. The media server may perform inpainting using the generative model to inpaint an area of a virtual object using a pattern generated using the irregular polygon. In one example, the media server may use an einstein, an aperiodic monotile, to generate a pattern (e.g., a pattern to fill in petals of a virtual lotus, a three-dimensional forest, etc.) for presentation at a client device (e.g., an augmented reality headset). The media server may generate different patterns based on how a user is interacting with a media application (e.g., the media server may generate a different pattern to target a different breathing rate for a user interacting with a meditation exercise at the client device).

20 Claims, 8 Drawing Sheets

GENERATIVE TILE PATTERNING USING APERIODIC MONOTILES

BACKGROUND

Technical Field

This disclosure relates generally to a media content system, and, more specifically, to a media content system that generates a pattern for a digital application using irregular polygons.

Description of the Related Art

Tiling is a technique used in media content systems to create seamless, repeating patterns using small rectangular or square images, known as tiles, arranged in a grid-like pattern to form a larger image. Tiling is used in video games, websites, and other digital applications to create backgrounds, patterns, and other visual elements. Tiling allows designers to create complex and visually appealing patterns using a small number of images, resulting in a more immersive and cohesive visual experience for users. Furthermore, tiling can optimize the performance of interactive media by reducing the file size of assets, making them quicker to load and less demanding on system resources.

Conventional media content systems are typically capable of generating a pattern by projecting an image onto a polygon and tiling the polygon. For example, a square image can be tiled to create a grid pattern of square images. Users perceive these digital patterns as being unnatural due to obvious visual artifacts. This can negatively impact a user's ability to mentally focus on an activity performed through a conventional media content system (e.g., an unnatural pattern rendered for a simulator will cause the user to be more aware of the computer-generated simulation).

To address this issue of an unnatural and apparent computer-generated pattern, conventional media content systems can also use aperiodic tiles, which can interlock to form different shapes and consequently, reduce identifiable repetitions in patterns. Aperiodic monotiles are type of tile that can create non-repeating patterns. Unlike regular tiles, they do not repeat in a regular pattern or grid, meaning that they can be arranged in different ways without creating some of the visual artifacts that are common with square or hexagonal tiles. An example of aperiodic tiles are Wang tiles. However, one drawback of Wang tiles and similar constructs is that they can be difficult and time-consuming to design and create. Unlike regular tiles, which can be easily arranged in a repeating pattern, aperiodic monotiles require careful planning and consideration to ensure that they can be arranged in a non-repeating pattern without leaving any gaps or overlaps, sometimes requiring multiple complex tile shapes to "fill in" those gaps. Furthermore, a conventional media content system that uses multiple polygons requires more storage space than using only a single polygon to create a pattern. Accordingly, conventional media content systems are challenged with being able to generate natural looking tiling patterns while conserving computer storage resources.

SUMMARY

A media system generates patterns using irregular polygons. In some embodiments, the media system can use a single irregular polygon to both create more natural looking tiling patterns and conserve computer storage resources. For example, the media system can use an aperiodic monotile like an einstein to generate visually appealing (e.g., natural-looking) patterns. The media system can use generative artificial intelligence (AI) to create the patterns. Generative models may be trained to generate patterns with seams (i.e., contacting edges between polygons) that appear to be seamless. For example, generative models may be trained to apply padding along a trace around a polygon, where the trace may depend on contacting edges between polygons. By applying a customized padding algorithm, the media system can avoid visual artifacts (e.g., noticeably repeating seams) produced by conventional media systems (e.g., that use circular convolution).

A method, non-transitory computer-readable storage medium, and computer system are disclosed for generating an aperiodic tiling for display at a client device, where an aperiodic tiling may be a non-repeating pattern created by one or more tiles. A virtual rendered object is identified using activity data corresponding to a user of a client device. The virtual rendered object is configured to have a pattern. An area of the virtual rendered object is determined. Using a machine learning model, an aperiodic tiling of an irregular polygon is generated. The machine learning model may be configured to apply convolutional padding to determine pixel values at a seam between a pair of interlocked irregular polygons. The aperiodic tiling may be representative of the pattern of the virtual rendered object. The aperiodic tiling of the irregular polygon is presented for display at the client device in the area of the virtual rendered object.

In some embodiments, the irregular polygon is an einstein. The virtual rendered object can be identified by using a mood score of the user, where the mood score is determined based on biometric data of the user. A shape of the virtual rendered object can be modified in response to a change in a mood score of the user. The aperiodic tiling may be updated to fill in the modified shape of the virtual rendered object using an inpainting model. The machine learning model may be configured to apply convolutional padding by identifying pairs of interlocking sides between two or more polygons and determining padding values of pixels at one edge between interlocking sides using values of pixels at other edges. A pair of interlocking sides can be identified by assigning a first set of weights to interlocking pairs of sides of two irregular polygons and assigning a second set of weights to non-interlocking pairs of sides of the two irregular polygons. Pairs of interlocking sides can be identified in response to identifying whether pairs of sides are weighted using either the first set of weights or the second set of weights.

Padding values at a seam between contacting edges of polygons can be determined using a linear combination of pixel values at different pairs of interlocking sides. For example, for a first einstein that interlocks with a second, third, and fourth einstein, the padding values at an edge between the first and second einstein can be determined using a linear combination of pixel values at edges between the first and third einsteins and the first and fourth einsteins. The machine learning model configured to apply convolutional padding may determine padding values along a predetermined trace around an edge between contacting polygons (e.g., between interlocking sides). In some embodiments, the trace may be determined using a classification of a polygon based on how the polygon interlocks with other polygons.

The aperiodic tiling of the irregular polygon may be presented for display at the client device in the area of the virtual rendered object by executing a wrapper function configured to apply the aperiodic tiling into a target application. In some embodiments, the target application is a game engine. A three-dimensional (3D) irregular polygon can be generated to create a 3D pattern. The 3D irregular polygon may include one or more virtual rendered objects on a surface of the 3D irregular polygon. Multiple 3D irregular polygons can be generated in an aperiodic pattern. The generated pattern may serve as a virtual surface (e.g., interlocking tiles serve as the surface for a 3D world and objects on the surface are environmental objects such as trees and rocks).

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

Figure (or "FIG.") 1 illustrates an example embodiment of a media system.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described.

A media system generates a pattern using aperiodic tiling. The pattern can be used to render or modify the appearance of objects displayed in a media application. For example, the media system can generate or modify generated patterns of objects displayed during a wellness experience based on sensed information regarding a user's mood. A "wellness experience" is a digitally augmented activity for changing a mental state, or "mood," of a user (e.g., as measured by biometric data). Digital augmentation may include one or more of displaying graphical objects (e.g., virtual reality (VR) or augmented reality (AR) objects), outputting audio (e.g., ambient music), or changing the appearance of displayed graphical objects (e.g., modifying patterns). Example activities that can be augmented are guided meditations, walks, breathwork, or focus games. During the joint wellness experience, the media system can determine moods or quantitative representations of the users' moods, which may be referred to herein as "mood scores," and change the digital augmentation using the mood scores. The media system can generate patterns using generative models that apply convolutional padding to create the appearance of seamless connections between tiled polygons. This can allow for a more immersive wellness experience, as a user is not distracted by obvious computer-generated visual artifacts. In these ways, the media system can adapt generative patterns for immersive wellness experiences to users' current mental or physical states.

Figure 1:
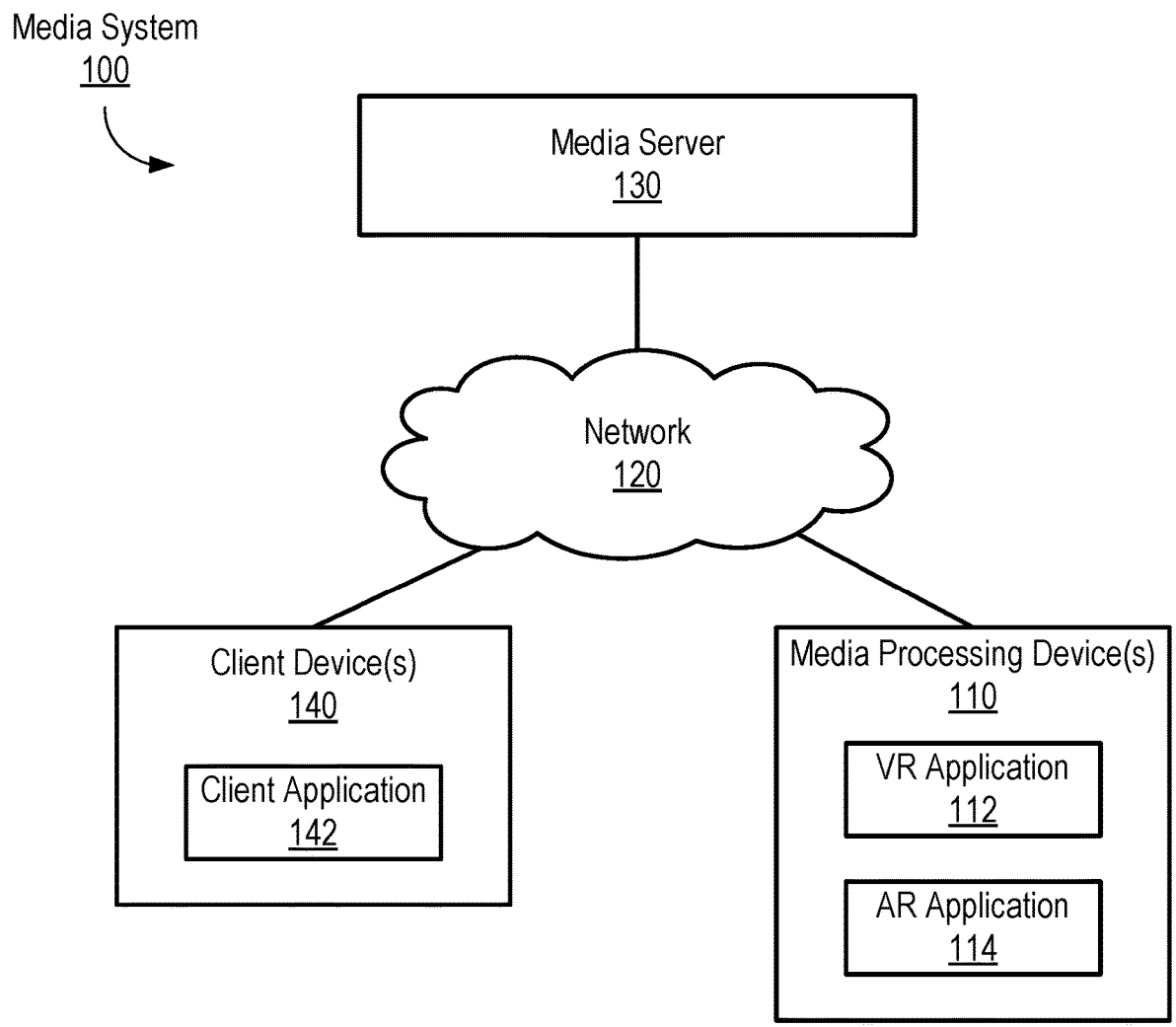

FIG. 1 is a block diagram of a media system 100 according to one embodiment. The media system 100 includes a network 120, a media server 130, one or more media processing devices 110 executing a virtual reality (VR) application 112 or an augmented reality (AR) application 114, and one or more client devices 140 executing a client application 142. In alternative configurations, different, additional, or fewer components may be in the media content system 100. For example, only one of the VR application 112 or the AR application 114 may be included at the media processing device 110.

The media processing device 110 includes a computer device for processing and presenting media content such as audio, images, video, or a combination thereof. In an embodiment, the media processing device 110 is a head-mounted VR or AR device. The media processing device 110 may detect various inputs including voluntary user inputs (e.g., input via a controller, voice command, body movement, or other convention control mechanism) and various biometric inputs (e.g., breathing patterns, heart rate, etc.). The media processing device 110 may execute the VR application 112 or the AR application 114 that provides an immersive wellness experience to the user, which may include visual and audio media content. The VR application 112 or the AR application 114 may control presentation of media content in response to the various inputs detected by the media processing device 110. For example, the VR application 112 may adapt presentation of visual content as the user moves his or her head to provide an immersive wellness experience. An embodiment of a media processing device 110 is described in further detail below with respect to FIG. 2.

The client devices 140 are computing devices that execute a client application 142 providing a user interface to enable the user to input and view information that is directly or indirectly related to a wellness experience. For example, the client application 142 may enable a user to set up a user profile that becomes paired with the VR application 112 or the AR application 114. Furthermore, the client application 142 may present various surveys to the user before and after wellness experiences to gain information about the user's reaction to the wellness experience. Examples of a client device 140 include a mobile device, tablet, laptop computer, desktop computer, gaming console, headset, or other network-enabled computer device.

The media server 130 is one or more computing devices for delivering media content to the media processing devices 110 via the network 120 and for interacting with the client device 140. For example, the media server 130 may stream media content to the media processing devices 110 to enable the media processing devices 110 to present the media content in real-time or near real-time. Alternatively, the media server 130 may enable the media processing devices 110 to download media content to be stored on the media processing devices 110 and played back locally at a later time. The media server 130 may obtain user data about users using the media processing devices 110 and process the data to dynamically generate media content tailored to a particular user. Particularly, the media server 130 may generate media content (e.g., in the form of a wellness experience) that is predicted to improve a particular user's mood based on profile information associated with the user received from the client application 142 and a machine-learned model that predicts how users' moods improve in response to different wellness experiences.

The network 120 may include any combination of local area or wide area networks, using both wired or wireless communication systems. In one embodiment, the network 120 uses standard communications technologies or protocols. In some embodiments, all or some of the communication links of the network 120 may be encrypted using any suitable technique.

Various components of the media system 100 of FIG. 1 such as the media server 130, the media device 110, and the client device 140 can each include one or more processors and a non-transitory computer-readable storage media storing instructions that, when executed by the one or more processors, cause the devices to carry out the functions attributed to the that device.

Figure 2:
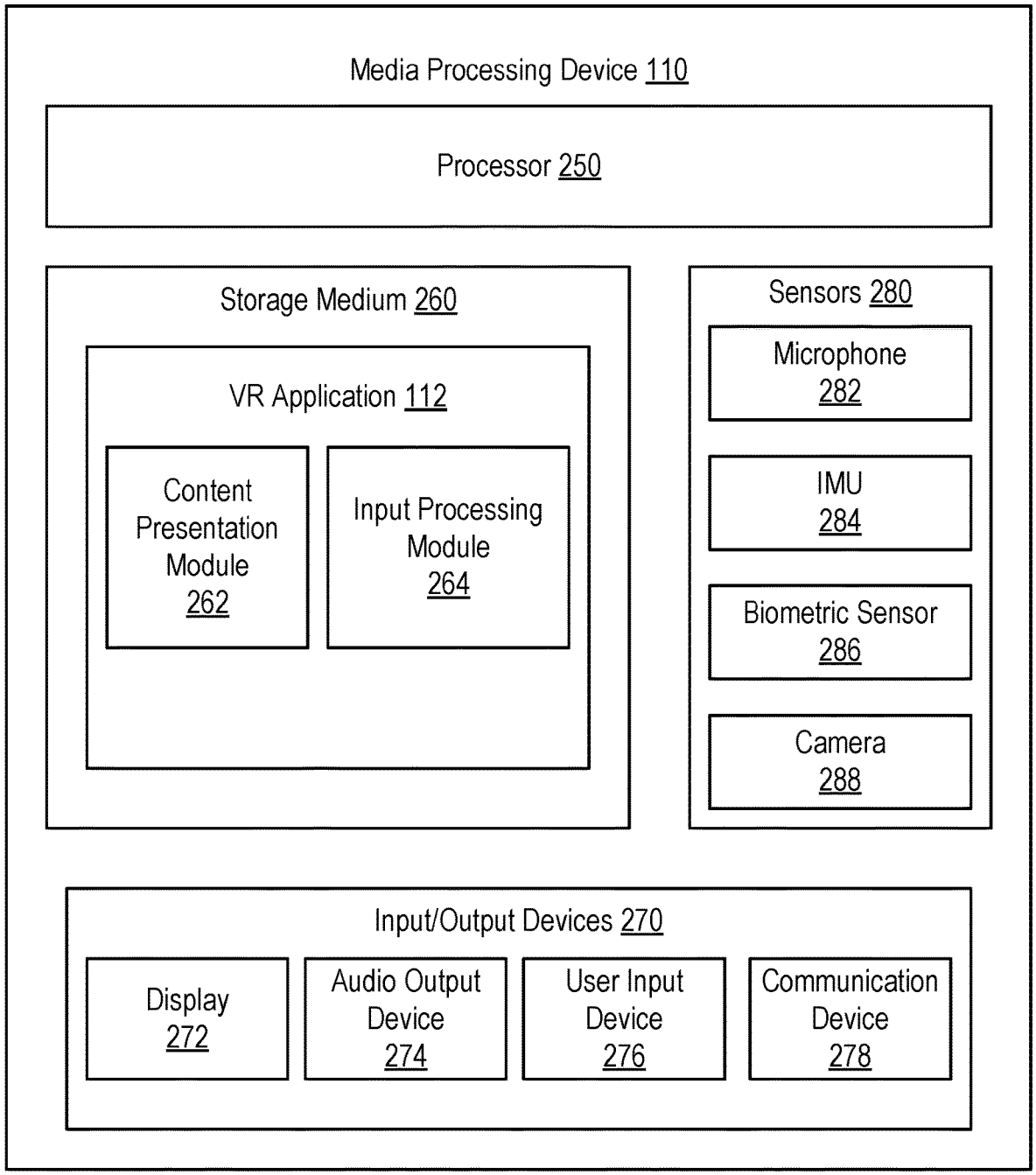
FIG. 2 illustrates an example embodiment of a media processing device.

FIG. 2 is a block diagram illustrating an embodiment of a media processing device 110. In the illustrated embodiment, the media processing device 110 includes a processor 250, a storage medium 260, input/output devices 270, and sensors 280. Alternative embodiments may include additional or different components.

The input/output devices 270 include various input and output devices for receiving inputs to the media processing device 110 and providing outputs from the media processing device 110. In an embodiment, the input/output devices 270 may include a display 272, an audio output device 274, a user input device 276, and a communication device 278. The display 272 is an electronic device for presenting images or video content such as an LED display panel, an LCD display panel, or other type of display. The display 272 may be a head-mounted display that presents immersive VR content. The audio output device 274 may include one or more integrated speakers or a port for connecting one or more external speakers to play audio associated with the presented media content. The user input device 276 can be any device for receiving user inputs such as a touchscreen interface, a game controller, a keyboard, a mouse, a joystick, a voice command controller, a gesture recognition controller, or other input device. The communication device 278 includes an interface for receiving and transmitting wired or wireless communications with external devices (e.g., via the network 120 or via a direct connection). For example, the communication device 278 may have one or more wired ports such as a USB port, an HDMI port, an Ethernet port, etc. or one or more wireless ports for communicating according to a wireless protocol such as Bluetooth, Wireless USB, Near Field Communication (NFC), etc.

The sensors 280 capture various sensor data that can be provided as additional inputs to the media processing device 110. For example, the sensors 280 may include a microphone 282, an inertial measurement unit (IMU) 284, one or more biometric sensors 286, and a camera 288. The microphone 282 captures ambient audio by converting sound into an electrical signal that can be stored or processed by the media processing device 110. The IMU 284 is a device for sensing movement and orientation. For example, the IMU 284 may include a gyroscope for sensing orientation or angular velocity and an accelerometer for sensing acceleration. The IMU 284 may furthermore process data obtained by direct sensing to convert the measurements into other useful data, such as computing a velocity or position from acceleration data. In an embodiment, the IMU 284 may be integrated with the media processing device 110. Alternatively, the IMU 284 may be communicatively coupled to the media processing device 110 but physically separate from it so that the IMU 284 could be mounted in a desired position on the user's body (e.g., on the head or wrist).

The biometric sensors 286 are one or more sensors for detecting various biometric characteristics of a user, such as heart rate, breathing rate, blood pressure, temperature, or other biometric data. The biometric sensors may be integrated into the media processing device 110, separate sensor devices that may be worn at an appropriate location on the human body, or both. In one embodiment, the biometric sensors communicate sensed data to the media processing device 110 via a wired or wireless interface. The camera 288 may capture image or video data of the environment in which the media processing device 110 operates. The image or video data may be used by the media server 130 to render an augmented wellness experience. For example, an AR view of a user's real-world environment, with AR objects overlayed onto the real world environment, may be generated using the AR application 114.

The storage medium 260 (e.g., a non-transitory computer-readable storage medium) stores a VR application 112 including instructions executable by the processor 250 for carrying out functions attributed to the media processing device 110 described herein. In an embodiment, the VR application 112 includes a content presentation module 262 and an input processing module 264. The content presentation module 262 presents media content via the display 272 and the audio output device 274. The input processing module 264 processes inputs received via the user input device 276 or from the sensors 280 and provides processed input data that may control the output of the content presentation module 262 or may be provided to the media processing server 130. For example, the input processing module 264 may filter or aggregate sensor data from the sensors 280 prior to providing the sensor data to the media server 130.

Figure 3:
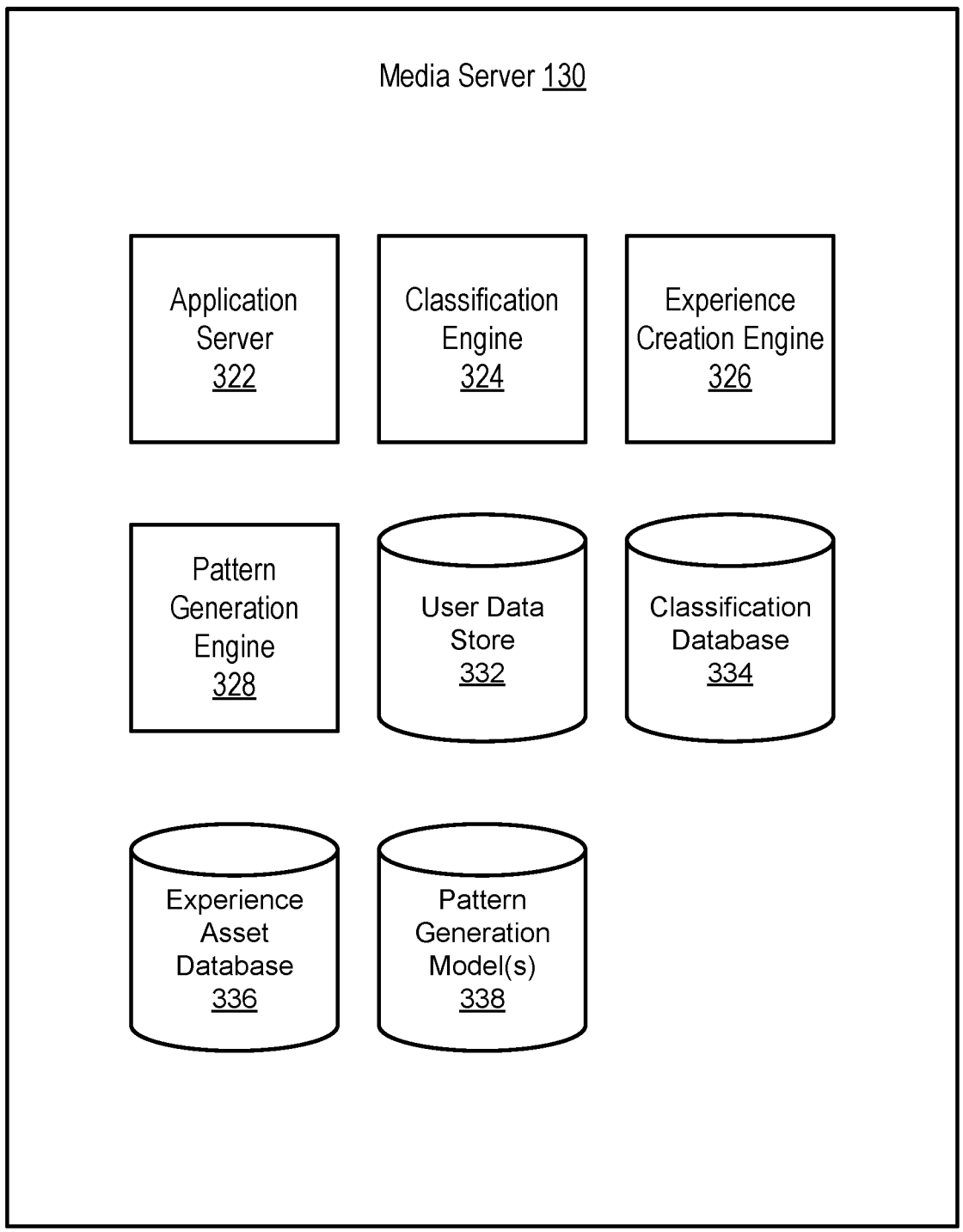
FIG. 3 illustrates an example embodiment of a media server.

FIG. 3 illustrates an example embodiment of a media server 130. The media server 130 includes an application server 322, a classification engine 324, an experience creation engine 326, a pattern generation engine 328, a user data store 332, a classification database 334, an experience asset database 336, and one or more pattern generation models 338. In alternative embodiments, the media server 130 may have different or additional components. Various components of the media server 130 may be implemented as a processor and a non-transitory computer-readable storage medium storing instructions that when executed by the processor causes the processor to carry out the functions described.

The experience asset database 336 stores digital assets that may be combined to create a wellness experience. Digital assets may include graphical objects, audio objects, and color palettes. Each digital asset may be associated with asset metadata describing characteristics of the digital asset and stored in association with the digital asset. For example, a graphical object may have attribute metadata specifying a shape of the object, a size of the object, or one or more colors associated with the object, etc. Graphical objects can be procedurally generated. For example, a graphical object may be a plant growing from a seed. In another example, a graphical object may be a dynamically growing or expanding lotus, which may have changing patterns as the lotus grows. Aspects of procedural generation may include morphology, patterns, animation, links to other objects, reaction patterns to user input, etc. In particular, pattern generation is described with respect to the pattern generation engine 328.

Graphical objects may include a background scene or template (which may include still images or videos) and foreground objects (that may be still images, animated images, or videos). Foreground objects may move in three-dimensional space throughout the scene and may change in size, shape, color, or other attributes over time. Graphical objects may depict real objects or individuals, or may depict abstract creations.

Audio objects may include music, sound effects, spoken words, or other audio. Audio objects may include long audio clips (e.g., several minutes to hours) or very short audio segments (e.g., a few seconds or less). Audio objects may furthermore include multiple audio channels that create stereo effects.

Color palettes include a coordinated set of colors for coloring one or more graphical objects. A color palette may map a general color attributed to a graphical asset to specific RGB (or other color space) color values. By separating color palettes from color attributes associated with graphical objects, colors can be changed in a coordinated way during a wellness experience independently of the depicted objects. For example, a graphical object (or particular pixels thereof) may be associated with the color "green," gut the specific shade of green is controlled by the color palette, such that the object may appear differently as the color palette changes.

Digital assets may furthermore have one or more scores associated with them representative of a predicted association of the digital asset with an improvement in mood that will be experienced by a user having a particular user profile when the digital asset is included in a wellness experience. In an embodiment, a digital asset may have a set of scores that are each associated with a different group of users (e.g., a "cohort") that have similar profiles. Furthermore, the experience asset database 336 may track which digital assets were included in different wellness experiences and to which users (or their respective cohorts) the digital assets were presented.

In an embodiment, the experience asset database 336 may include user-defined digital assets that are provided by the user or obtained from profile data associated with the user. For example, the user-defined digital assets may include pictures of family members or pets, favorite places, favorite music, etc. The user-defined digital assets may be tagged in the experience asset database 336 as being user-defined and available only to the specific user that the asset is associated with. Other digital assets may be general digital assets that are available to a population of users and are not associated with any specific user.

The experience creation engine 326 generates the wellness experience by selecting digital assets from the experience asset database 336 and presenting the digital assets according to a particular time sequence, placement, and presentation attributes. For example, the experience creation engine 326 may choose a background scene or template that may be colored according to a particular color palette. Over time during the wellness experience, the experience creation engine 326 may cause one or more graphical objects to appear in the scene in accordance with selected attributes that control when the graphical objects appear, where the graphical objects are placed, the size of the graphical object, the shape of the graphical object, the color of the graphical object, how the graphical object moves throughout the scene, when the graphical object is removed from the scene, etc. Similarly, the experience creation engine 326 may select one or more audio objects to start or stop at various times during the wellness experience. For example, a background music or soundscape may be selected and may be overlaid with various sounds effects or spoken word clips.

In some embodiments, the timing of audio objects may be selected to correspond with presentation of certain visual objects. For example, metadata associated with a particular graphical object may link the object to a particular sound effect that the experience creation engine 326 plays in coordination with presenting the visual object. Elements of the wellness experience may be generated procedurally. For example, wellness text in the form of guidance meditations can be generated using neural networks. Procedurally generated elements, such as affirmations, mantras, mindfulness meditations, etc., can be tailored to the user's profile.

The experience creation engine 326 may furthermore control background graphical or audio objects to change during the course of a wellness experience, or may cause a color palette to shift at different times in a wellness experience. The collection of digital assets selected by the experience creation engine 326 for presentation may be referred to as "augmented wellness environment data." The augmented wellness environment data may also include instructions to display digital assets at client devices.

The experience creation engine 326 may intelligently select which assets to present during a wellness experience, the timing of the presentation, and attributes associated with the presentation to tailor the wellness experience to a particular user. For example, the experience creation engine 326 may identify a cohort associated with the particular user, and select specific digital assets for inclusion in the wellness experience based on their scores for the cohort or other factors such as whether the asset is a generic asset or a user-defined asset. In an embodiment, the process for selecting the digital assets may include a randomization component. For example, the experience creation engine 326 may randomly select from digital assets that have at least a threshold score for the particular user's cohort.

Alternatively, the experience creation engine 326 may perform a weighted random selection of digital assets where the likelihood of selecting a particular asset is weighted based on the score for the asset associated with the particular user's cohort, weighted based on whether or not the asset is user-defined (e.g., with a higher weight assigned to user-defined assets), weighted based on how recently the digital asset was presented (e.g., with higher weight to assets that have not recently been presented), or other factors. The timing and attributes associated with presentation of objects may be defined by metadata associated with the object, may be determined based on learned scores associated with different presentation attributes, may be randomized, or may be determined based on a combination of factors. By selecting digital assets based on their respective scores, the experience creation engine 326 may generate a wellness experience predicted to a have a high likelihood to improve the user's moods. Selection and presentation of objects can further be informed by accumulated tracked data about the user. For example, the experience creation engine 326 may track a user's energy levels throughout the day, week, month, or year, and drive content generation based on the tracked information.

The experience creation engine 326 may present generated patterns for display at a client device. In some embodiments, the experience creation engine 326 can present aperiodic tiling of an irregular polygon in an area of the virtual rendered object by executing a wrapper function configured to apply the aperiodic tiling into a target application. The target application may be a game engine. The experience creation engine 326 may generate for display a 3D irregular polygon that includes one or more virtual objects on a surface of the 3D irregular polygon. The experience creation engine 326 can present for display at a client device a pattern of the 3D irregular polygons. The generation of the pattern is described with respect to the pattern generation engine 328.

In an embodiment, the experience creation engine 326 pre-renders the wellness experience before playback such that the digital objects for inclusion and their manner of presentation are pre-selected. Alternatively, the experience creation engine 326 may render the wellness experience in substantially real-time by selecting objects during the wellness experience for presentation at a future time point within the wellness experience. In this embodiment, the experience creation engine 326 may adapt the wellness experience in real-time based on biometric data obtained from the user to adapt the experience to the user's perceived change in mood. For example, the experience creation engine 326 may compute a mood score based on acquired biometric information during the wellness experience and may identify digital assets for inclusion in the wellness experience based in part on the detected mood score.

The application server 322 obtains various data associated with users of the VR application 112 and the client application 142 during and in between wellness experiences and indexes the data to the user data store 332. For example, the application server 322 may obtain profile data from a user during an initial user registration process (e.g., performed via the client application 142) and store the user profile data to the user data store 332 in association with the user. The user profile information may include, for example, a date of birth, gender, age, and location of the user. Once registered, the user may pair the client application 142 with the VR application 112 so that usage associated with the user can be tracked and stored in the user data store 332 together with the user profile information.

The user data store 332 may also store avatars used to identify the user. The experience creation engine 326 may change the appearance of the avatar when particular conditions are met. The conditions may be related to time, location, people, activities, or any other suitable measure of a user's wellness experiences. For example, the avatar may change appearances each time the user completes a predetermined duration of wellness experiences in (e.g., changing appearances after 10 hours, 100 hours, and 1000 hours). In another example, the avatar may have a first appearance when the user is at a first location (e.g., home) and a second appearance when the user is at a second location (e.g., office). In some embodiments, the application server 322 may determine a number of wellness experiences that a user has completed and modify the user's avatar based on the determined number of wellness experiences.

In one embodiment, the tracked data includes survey data from the client application 112 obtained from the user between wellness experiences, biometric data from the user captured during (or within a short time window before or after) the user participating in a wellness experience, and usage data from the VR application 112 representing usage metrics associated with the user. For example, in one embodiment, the application server 322 obtains self-reported survey data from the client application 142 provided by the user before and after a particular wellness experience. The self-reported survey data may include a first self-reported mood score (e.g., a numerical score on a predefined scale) reported by the user before the wellness experience and a second self-reported mood score reported by the user after the wellness experience. The application server 322 may calculate a delta between the second self-reported mood score and the first self-reported mood score, and store the delta to the user data store 332 as a mood improvement score associated with the user and the particular wellness experience.

Additionally, the application server 322 may obtain self-reported mood tracker data reported by the user via the client application 142 at periodic intervals in between wellness experiences. For example, the mood tracker data may be provided in response to a prompt for the user to enter a mood score or in response to a prompt for the user to select one or more moods from a list of predefined defined moods representing how the user is presently feeling. The application server 322 may furthermore obtain other text-based feedback from a user and perform a semantic analysis of the text-based feedback to predict one or more moods associated with the feedback.

The application server 322 may furthermore obtain biometric data from the media processing device 110 that is sensed during a particular wellness experience. Additionally, the application server 322 may obtain usage data from the media processing device 110 associated with the user's overall usage (e.g., characteristics of wellness experiences experienced by the user, a frequency of usage, time of usage, number of experiences viewed, etc.). All of the data associated with the user may be stored to the user data store 332 and may be indexed to a particular user and to a particular wellness experience.

The classification engine 324 classifies data stored in the user data store 332 to generate aggregate data for a population of users. For example, the classification engine 324 may cluster users into user cohorts. A user cohort is a group of users having sufficiently similar user data in the user data store 332 (e.g., having user data for which a similarity metric is less than or greater than a threshold). When a user first registers with the media experience server 130, the classification engine 324 may initially classify the user into a particular cohort based on the user's provided profile information (e.g., age, gender, location, etc.). As the user participates in wellness experiences, the user's survey data, biometric data, and usage data may furthermore be used to group users into cohorts. Thus, the users in a particular cohort may change over time as the data associated with different users is updated. Likewise, the cohort associated with a particular user may shift over time as the user's data is updated.

The classification engine 324 may aggregate data associated with a particular cohort to determine general trends in survey data, biometric data, or usage data for users within a particular cohort. Furthermore, the classification engine 324 may furthermore aggregate data indicating which digital assets were included in wellness experiences experienced by users in a cohort. The classification engine 324 may index the aggregate data to the classification database 334. For example, the classification database 334 may index the aggregate data by gender, age, location, experience sequence, and assets. The aggregate data in the classification database 334 may indicate, for example, how mood scores changed before and after wellness experiences including a particular digital asset. Furthermore, the aggregate data in the classification database 334 may indicate, for example, how certain patterns in biometric data correspond to surveyed results indicative of mood improvement.

The classification engine 324 may learn correlations between particular digital assets included in experiences viewed by users within a cohort and data indicative of mood improvement. The classification engine 324 may update the scores associated with the digital assets for a particular cohort based on the learned correlations.

The pattern generation engine 328 generates pattern for presentation at a media processing device. The generated pattern may be a pattern of a virtual object or collections of virtual objects (e.g., a surface of an abstract object, representing a three-dimensional forest, stars in a galaxy, etc.). Patterns may include colors, textures, shapes, any suitable element of visual design, or a combination thereof. The pattern generation engine 328 may generate pattern using one or more polygons or polytopes. Although the pattern generation is described with respect to polygons for convenience, the pattern generation may also be applicable to polytopes or other three-dimensional shapes. For example, the pattern generation engine 328 may generate a pattern using a single irregular polygon such as an einstein. The pattern may be composed using a combination of different polygons. The pattern may be composed of a repeating or non-repeating pattern (i.e., an aperiodic pattern). A polygon may be referred to as a "tile." Tile types include square, triangle, chevron, ogee, ogee drop, kite, Wang tiles, Penrose tiles, socolar tiles, einstein, any suitable polygonal tiling, or a combination thereof.

The pattern generation engine 328 may use an irregular polygon (e.g., an einstein) to create non-repeating patterns. For example, the einstein tile may be arranged in different ways without creating visual artifacts from polygons that create repeating patterns (e.g., square or hexagonal tiles). In addition to avoiding the appearance of repetition (e.g., allowing the pattern to appear more naturally generated), the use of einstein tiles by the pattern generation engine 328 allows for lower memory usage as compared to other aperiodic tiles, which may require storage of two or more different polygons to form patterns (e.g., Penrose tiling). By using an einstein to create a pattern, the pattern generation engine 328 may store a single einstein tile without additional tiles. The pattern generation engine 328 may use an irregular polygon that is rotation agnostic and thus, able to rotate when connecting to another of the same polygon to form different interlocked shapes. An einstein tile is one example of an irregular polygon that is rotation agnostic. The term "interlocking" may refer to two or more polygons that contact one another at two or more sides between pairs of polygons.

The pattern generation engine 328 may project an irregular polygon on a square or rectangular image and apply a padding algorithm when tiling the projected polygon to create a pattern. In using an irregular polygon, the pattern generation engine 328 may arrange the irregular polygons in a non-repeating pattern and generate values of pixels at seams such that edges between irregular polygons in contact with one another appear seamless. A seam includes pixels at edges in contact between two or more tiles. In some circumstances, a seam may cause visual artifact between two tiles in contact with one another, where the visual artifact is a distinct discontinuity between the pattern applied to the tiles. The visual artifact created by seams produces an unnatural appearance (e.g., an easily recognizable pattern generated by a computer). The pattern generation engine 328 can apply a customized padding algorithm to determine values of pixels at the edges between irregular polygons such that the contact between the polygons appears seamless.

The pattern generation engine 328 may apply a machine learning model to an irregular polygon, where the machine learning model is configured to apply convolutional padding to determine pixel values at a seam. The machine learning model may determine padding values along a trace around the edge between a pair of contacting sides (e.g., interlocked sides). The machine learning model may be an Img2Img model, ControlNet model, any suitable generative model, or combination thereof. The machine learning model may be stored in the pattern generation model database 338. The pair of irregular polygons may contact one another, where a seam is between a pair of contacting edges. The machine learning model may be a generative model (e.g., Stable Diffusion™) that allows for ControlNet or similarly controlled image-to-image inpainting. For example, the pattern generation engine 328 may provide an einstein as a ControlNet target to determine one or more seams between two or more interlocked einsteins. The machine learning model may include a convolutional layer to perform convolutional padding to determine pixel values at seams. The pattern generation engine 328 may determine a convolutional kernel for the convolutional padding. The pattern generation engine 328 may receive user-specified values for the convolutional kernel and/or train values of the kernel based on training data (e.g., training images of padded polygon patterns).

The pattern generation engine 328 may determine pixel values at a seam based on values of connecting edges of two or more polygons, which may include polygons other than the two polygons in contact at the seam. The pixel values at a seam may be referred to as "padding values." One example of padding values is depicted in FIG. 3. The pattern generation engine 328 may determine two or more pairs of interlocking sides and determine padding values of respective pixels at an edge using pixel values at one or more other edges. The pattern generation engine 328 may determine the padding values by determining a linear combination of the pixel values at the one or more other edges. One example of a linear combination of pixel values of multiple edges is described with respect to FIG. 6.

Figure 6:
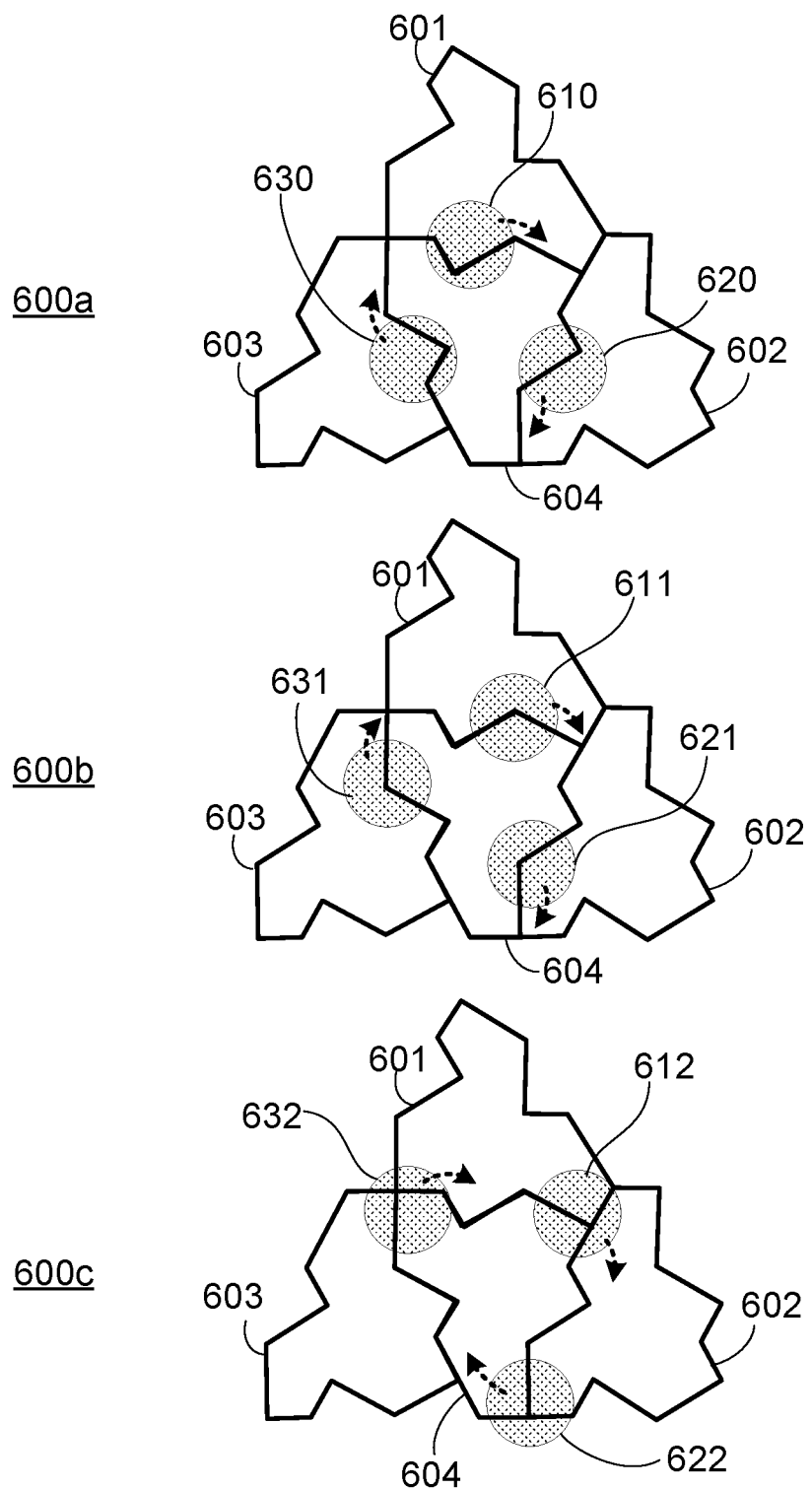
FIG. 6 depicts a trace around an irregular polygon, in accordance with one embodiment.

The pattern generation engine 328 may determine padding values based on weights determined by classifying the irregular polygon. The pattern generation engine 328 may classify an irregular polygon based on characteristics related to how the irregular polygon interlocks with other irregular polygons (e.g., a number of interlocking polygons, an orientation or rotation of one or more interlocked polygons, any suitable characteristic relating to interlocking, or combination thereof). The pattern generation engine 328 may classify connections between two sides of an irregular polygon. For example, two einsteins may interlock in various ways (i.e., at multiple pairs of edges). FIG. 6 shows an example of four interlocking einsteins, where twelve sides of one of the einsteins interlocks with the three other einsteins (i.e., twelve pairs of interlocking sides). The pattern generation engine 328 may classify, for each of the thirteen sides of the einstein, possible connecting edges of another einstein.

The pattern generation engine 328 may identify interlocking and/or non-interlocking pairs of sides of two irregular polygons. In some embodiments, the interlocking and/or non-interlocking pairs of sides may be identified manually and provided to the pattern generation engine 328 (e.g., a table of interlocking and/or non-interlocking sides stored in a database of the media server 130). The pattern generation engine 328 may assign weights to pairs of interlocking and/or non-interlocking sides. The pattern generation engine 328 may assign different weights depending on whether the sides interlock or not. The pattern generation engine 328 may use the assigned weights to identify whether two sides interlock or not. For example, the pattern generation engine 328 may assign even valued weights to pairs of interlocking sides and odd valued weights to pairs of non-interlocking sides. In this example, after identifying two connecting edges have an even valued weight, the pattern generation engine 328 may determine that the two connecting edges are interlocking.

The pattern generation engine 328 may apply convolutional padding along a trace around the edge between a pair of interlocking sides. The trace may be predetermined. The pattern generation engine 328 may determine a trace for convolutional padding. One example of a trace is shown in FIG. 6. In some embodiments, the pattern generation engine 328 may determine a trace by determining points at edges of the irregular polygon that are separated by a predetermined angle from one another (e.g., four points that are spaced ninety degrees apart or three points that are spaced hundred twenty degrees apart). In some embodiments, the pattern generation engine 328 may determine a trace by receiving one or more user-specified points along one or more edges of an irregular polygon to apply padding. A convolutional kernel may follow the trace along the edges of an irregular polygon.

The pattern generation engine 328 may use a machine learning model to perform inpainting with an irregular polygon (e.g., an einstein). In some embodiments, the pattern generation engine 328 may perform inpainting by modifying a texture or visual element of a single polygon (i.e., among a tiling of multiple polygons) and determine pixel values at edges to promote seamlessness between other polygons contacting the single polygon. In some embodiments, the pattern generation engine 328 may perform inpainting by modifying a texture or visual element of multiple polygons. The pattern generation engine 328 can generate a mask based on an irregular polygon and a target area of content that is selected for inpainting. In some embodiments, the target area may be larger than the area of the irregular polygon. The pattern generation engine 328 may determine dimensions (e.g., an area, width, height, etc.) of a target area and the dimension of the irregular polygon to determine a number of the irregular polygon from which to create a pattern. The inpainting mask may be composed of the determined number of irregular polygons.

The pattern generation engine 328 may perform inpainting using a heat diffusion equation to modify pixel values of unknown regions of an image based on the known regions. In one embodiment, the pattern generation engine 328 may generate new types of tiles to perform inpainting. In another embodiment, the pattern generation engine 328 may reuse existing tiles that were used to generate the pattern to be inpainted. In either of these two embodiments, the pattern generation engine 328 may determine a largest polygon or polytope that satisfies a condition of containing all tiles to be inpainted. This largest polygon or polytope may be a template for inpainting. To determine the largest polygon or polytope, the pattern generation engine 328 may iterate through different polygons or polytopes using the tile patterning described here (e.g., applying a machine learning model to a polytope to generate an aperiodic tiling, where the machine learning model determines pixel values at seams between pairs of interlocking polytopes). In one example, the pattern generation engine 328 may iterate until a single polygon or polytope is larger than the area to be inpainted and use a polygon or polytope of an earlier iteration for inpainting. The pattern generation engine 328 may then reuse existing tiles to fill in the polygon or polytope template. In another embodiment of performing inpainting, the pattern generation engine 328 may apply heat diffusion across a single polytope or polygon and then iterate on each sub-tile that composes the polytope or polygon using the tile patterning described here (e.g., applying a machine learning model which also determines pixel values at seams between the sub-tiles).

Figure 4:
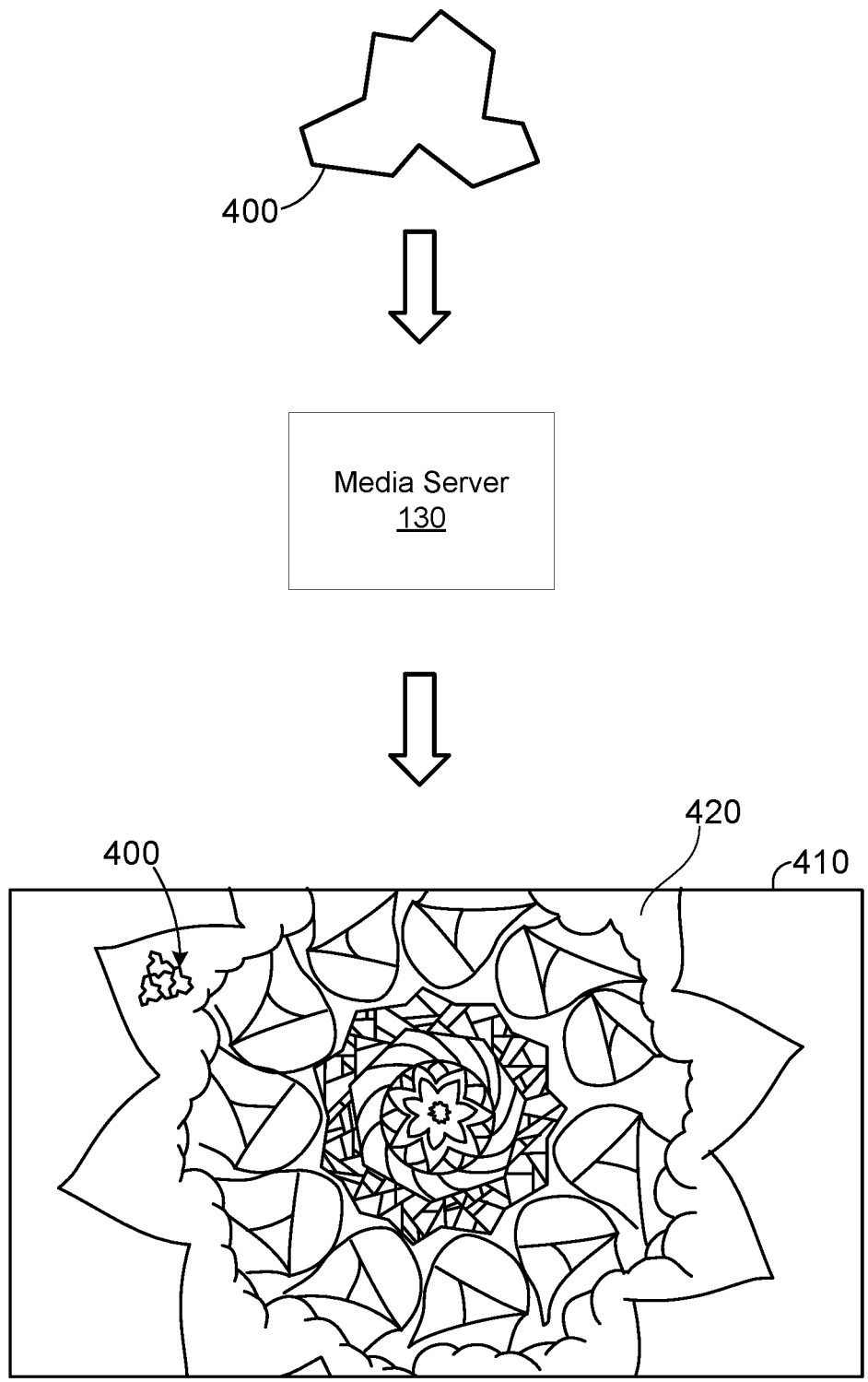
FIG. 4 depicts an example embodiment of pattern generation using an irregular polygon.

The pattern generation engine 328 may use an inpainting model to generate a pattern of irregular polygons from an image and a mask. The inpainting model may be stored in the pattern generation model database 338. In some embodiments, the pattern generation engine 328 uses the inpainting model to regenerate patterns of a virtual rendered object that is changing shape and consequently, changing the depiction of the pattern of the object. For example, as shown in FIG. 4, a virtual object may be a continuously expanding lotus. As petals on the outer rings of the lotus grow outward, the amount of area of the display covered by the pattern of the petals increases. The pattern generation engine 328 may use a mask corresponding to areas of the image in which the petals on the outer ring of the lotus exists.

The pattern generation engine 328 may generate a new pattern depending on a sensed mental or physical state of a user (e.g., mood score). The pattern generation engine 328 may use a machine learning model to generate a first pattern of a virtual object and in response to determining a change in a user's mood score, may determine a second pattern to display. The second pattern may be chosen to achieve a target mood score (e.g., raise the mood score to increase user satisfaction during an AR experience). For example, the experience creation engine 326 may track patterns displayed to a user and associate the tracked pattern with corresponding mood score changes for a user or a cohort of users, where the mood score changes can be determined by the experience creation engine 326 via sensed biometric data and/or by user-submitted mood scores received by the application server 322. The tracked associations between patterns and mood scores may be stored in the user data store 332. The pattern generation engine 328 may change a presently displayed pattern by using an inpainting model to regenerate a second pattern over a first pattern (e.g., replacing the first pattern with the second pattern).

In some embodiments, the pattern generation engine 328 may generate a 3D irregular polygon that includes one or more virtual objects on a surface of the 3D irregular polygon. The pattern generation engine 328 can generate a pattern of the 3D irregular polygons such that the experience creation engine generates a 3D surface with tiled virtual objects. For example, the pattern generation engine 328 can generate a 3D surface of a desert using tiled einsteins, where a single 3D einstein has virtual objects such as a cactus, a rock, etc. on the surface of the 3D einstein. The pattern generated using the 3D einstein may be used to create a 3D desert having a pattern of desert objects (e.g., cacti and rocks). By using a rotation agnostic tile such as an einstein, the pattern generation engine 328 allows the desert objects to appear to be located more randomly (e.g., naturally) than compared to a generated desert using a non-rotation agnostic tile (e.g., a square).

FIG. 4 depicts an example embodiment of pattern generation using an irregular polygon 400. The media server 130 performs the pattern generation. The generated pattern can be incorporated into an AR experience 410. The AR experience 410 may be displayed at a display (e.g., the display 272) of a media processing device. The AR experience 410 includes a lotus 420 that may be animated (e.g., expanding outward towards the user, giving the appearance that the user is traveling into the center of the lotus). The lotus 420 is one example of a virtual object. The lotus 420 may be generated using various patterns, where different patterns may be used to depict different layers of petals of the lotus 420. The media server 130 can generate the pattern of one of the layers of petals using the irregular polygon 400. For clarity, four of the irregular polygons 400 are depicted as being tiled together to form part of the pattern of the lotus 420, but the media server 130 may generate more of the lotus 420 with the irregular polygon 400 pattern. While the irregular polygon 400 is depicted as an einstein, the media server 130 is not limited to generating patterns using einsteins and may generate patterns using other polygons.

In some embodiments, the AR experience 410 may include interactively generated patterns. The media server 130 may receive as input biometric sensor information (e.g., heart rate or breathing rate) or other user feedback (e.g., manual entry of user mood score) in addition to the irregular polygon 400. The media server 130 may generate a first pattern based on a first mood score and subsequently, generate a second pattern to replace the first pattern in response to determining a second mood score. The media server 130 may change patterns displayed to target a desired mood change in the user (e.g., to increase a sense of relaxation in the user). The media server 130 may change patterns as feedback to the user (e.g., depicting a first pattern when a user is outside of a target breathing rate range and depicting a second pattern when the user is within the target breathing rate range).

Figure 5:
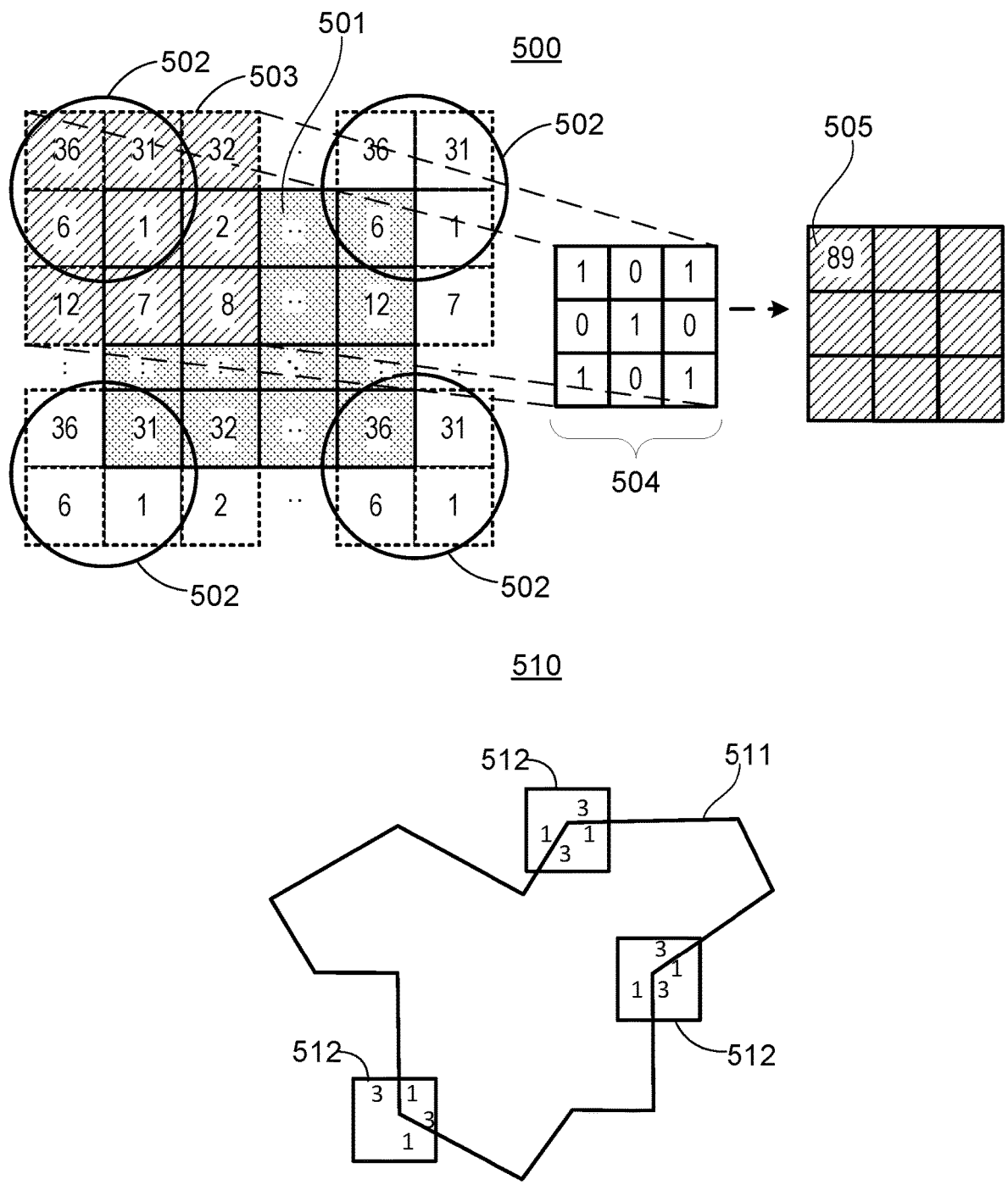
FIG. 5 depicts example embodiments of polygon edges in a padding context.

FIG. 5 depicts example embodiments 500 and 510 of polygon edges in a padding context. The embodiments 500 and 510 show two different polygons (i.e., a square and an einstein, respectively) and similar sub-patterns at edges where a polygon contacts other polygons. While one method of padding may be applied to regular polygons such as squares, the media server 130 may apply a customized padding method to irregular polygons. Applying the customized padding method may include determining a trace around edges of the irregular polygon and determining a linear combination of pixel values based on the determined trace.

The embodiment 500 shows edges of a square 501. An image may be projected into the square 501. The square 501 has image pixel values from one to thirty-six. Additional copies of the square 501 are placed around the square 501, and sub-patterns are formed at the edges of the square 501 (e.g., the sub-pattern 502 is formed around the corners of the square 501). The media server 130 may apply a convolutional kernel 504 to the tiled square 501 to obtain padding values at the seams between contacting polygons (e.g., the padding value 505). The media server 130 may determine a trace around the edges of the square 501, where the trace follows different sub-patterns of pixels between two or more contacting square tiles (e.g., the sub-pattern 502, a sub-pattern including pixel values two, three, thirty-two, and thirty-three, etc.). The media server 130 may determine a convolutional padding based on a linear combination of pixel values including those within the sub-pattern 502. Because a square is not a rotation agnostic polygon (i.e., a square cannot be rotated to form a differently shaped pattern with other squares), the media server 130 may apply the same trace to each square tiled pattern. In contrast, the media server 130 may determine different traces for tiling irregular polygons that are rotation agnostic due to the different contacting edges and corresponding pixel values for respective rotations.

The embodiment 510 shows edges of an einstein 511. An image may be projected into the einstein 511. The einstein 511 has pixel values, including the pixels within the sub-pattern 512. The media server 130 may determine a convolutional padding based on a linear combination of pixel values including those within the sub-pattern 512. The media server 130 may identify sub-patterns based on classifications of the einstein 511 and the possible contacts with other einsteins. For example, the classifications may include a class characterized by two or more contacting einsteins, the orientation of each contacting einstein (e.g., whether the einstein is flipped about an axis or not), an identification of sides that are in contact (e.g., the media server 130 may implement numerical identifiers for each side of the einstein), any suitable characteristics for irregular polygons in contact, or a combination thereof. The media server 130 may determine a trace based on identified sub-patterns. For example, the media server 130 may determine to trace around edges of an irregular polygon following groups of pixels corresponding to identified sub-patterns. The media server 130 may apply a machine learning model to an irregular polygon, where the machine learning model is trained to determine padding values using determined traces.

FIG. 6 depicts a trace 600a-c around an irregular polygon 604, in accordance with one embodiment. While the irregular polygon 604 is depicted as an einstein, a media server (e.g., the media server 130) may use a different irregular polygon to generate a pattern. The irregular polygon 604 is in contact with three other of the same irregular polygons 601, 602, and 603. Dashed arrows show a clockwise direction at which the pattern generation engine 328 may follow the edge of the irregular polygon 604. The trace 600a may include a first group of pixels 610, 620, and 630 for which the pattern generation engine 328 applies a linear combination to determine padding values. For example, the pattern generation engine 328 may determine a linear combination of the pixels 610, 620, and 630 to determine the padding values at the seam running through the pixels 610. The trace 600b may include a second group of pixels 611, 621, and 631 for which the pattern generation engine 328 applies a linear combination to determine padding values. Similarly, the trace 600c may include a third group of pixels 612, 622, and 632 for which the pattern generation engine 328 applies a linear combination to determine padding values.

Figure 7:
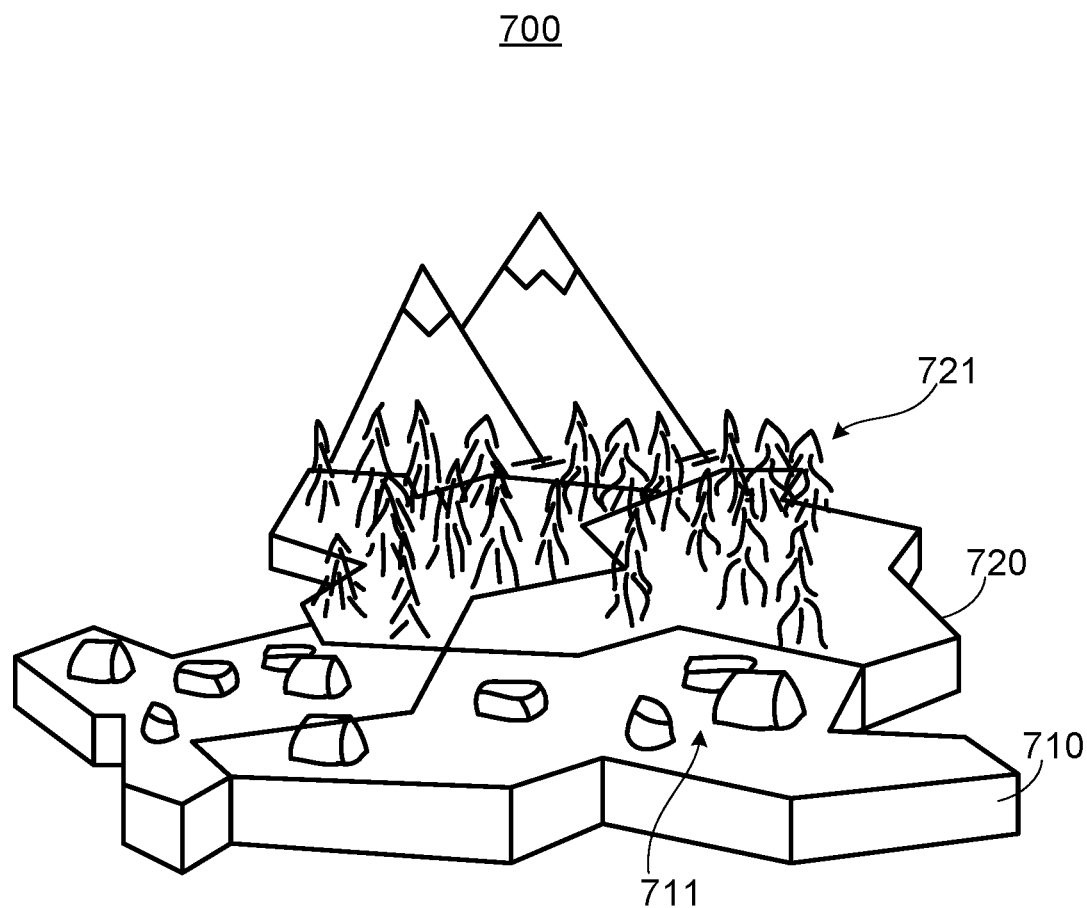
FIG. 7 depicts a pattern generated using a three-dimensional (3D) irregular polygon, in accordance with one embodiment.

FIG. 7 depicts a pattern generated using a three-dimensional (3D) irregular polygon, in accordance with one embodiment. The 3D pattern generation of FIG. 7 is another embodiment of pattern generation by the media server 130. The media server 130 may receive an irregular polygon and one or more 3D virtual objects to be generated at a surface of the irregular polygon. The media server 130 may generate the irregular polygon in 3D. For example, the pattern generation engine 328 of the media server 130 may generate 3D einstein tiles 710 and 720. The pattern generation engine 328 may generate the einstein 710 having 3D virtual objects 711 on the surface of the einstein 710. The 3D virtual objects may be rocks, and the pattern generated using the einstein 710 with the objects 711 may be a desert-like environment. Additionally, the pattern generation engine 328 may generate the einstein 720 having 3D virtual objects 721 on the surface of the einstein 720. The 3D virtual objects may be trees, and the pattern generated using the einstein 720 with the objects 721 may be a forest-like environment. By using a rotation agnostic tile, such as an einstein, the pattern generation engine 328 can generate 3D patterns that appear more natural because the arrangement of the 3D objects on the surface of the einsteins can be rotated with corresponding rotations of the einsteins and consequently, repetitions in the 3D objects are less apparent to users who view the patterns. Different environments may be generated using the einstein tile (e.g., mountain ranges, bodies of water, tundra, etc.). The media server 130 may generate different 3D patterns and is not limited to generating 3D worlds.

Figure 8:
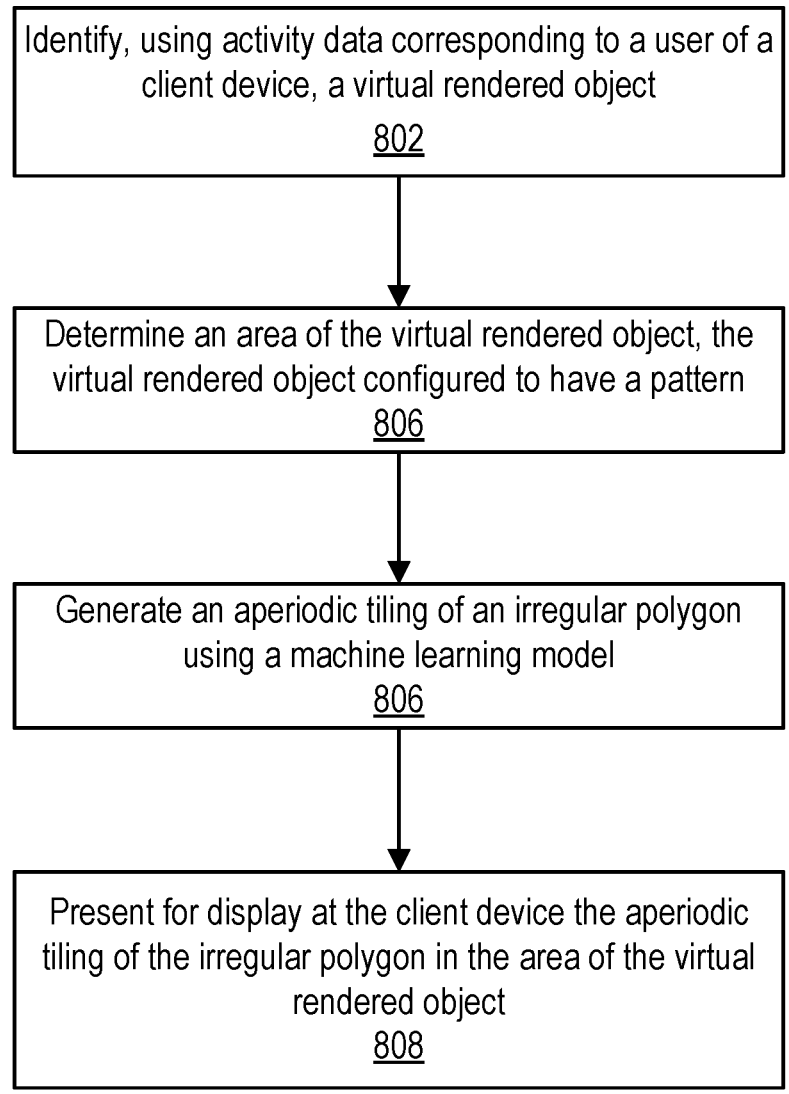
FIG. 8 illustrates an example embodiment of a process for generating a pattern for display using an irregular polygon.

FIG. 8 illustrates an example embodiment of a process for generating a pattern for display using an irregular polygon. In particular, the process includes using a machine learning model configured to apply convolutional padding to determine pixel values at a seam between a pair of interlocked irregular polygons. The process may be performed by the media server 130. The process may include additional, fewer, or different operations than shown in FIG. 8.

The media server 130 identifies 802 a virtual rendered object using activity data corresponding to a user of a client device. The activity data may include a type of activity performed (e.g., an activity to promote focus, a meditation activity, a breathing exercise, etc.), a duration spent performing the activity, a location where the activity is performed, a time at which the activity began, a number of users participating in the activity, any suitable information related to an activity performed at the media server including patterns generated by the pattern generation engine 328, or a combination thereof. For example, the media server 130 can identify 802 a lotus (e.g., the lotus 420) using activity data indicating that a user has begun a meditation exercise, where the lotus is animated to promote a target breathing and/or heart rate during the meditation exercise.

The media server 130 determines 804 an area of the virtual rendered object. The virtual rendered object can be configured to have a pattern. For example, a lotus may have a petal that can have either a solid color (i.e., without a pattern) or pattern in response to the media server 130 determining how the lotus should appear based on an activity for which the lotus is used, a mental state of the user, a physical state of the user, a number of users participating in the activity, any suitable characteristic upon which an appearance of a virtual object may depend, or a combination thereof. The determined area may be where the media server 130 generates the pattern for display. The area may cover a whole or a portion of the virtual rendered object. The media server 130 can determine 804 the area of the virtual rendered object based on a user interaction with a media application (e.g. in response to a user selecting an object for display, the media server 130 determines that the patterned area is selected to be the object's surface), biometric information (e.g., heart rate or breathing rate), an activity that a user is presently or previously engaged with (e.g., an activity to promote focus, a meditation activity, a breathing exercise, etc.), any suitable information for determining an area of a virtual object, or a combination thereof.

In one example, the media server 130 can determine 804 the area of an AR lotus (e.g., the lotus 420) based on a sensed state of the user. In this example, the media server 130 can determine that a user's heart rate has fallen outside of a target heart rate and in response, determine 804 that the area is a layer of petals of the lotus that occupies the most area on the display (e.g., the outermost layer of petals). In another example, the media server 130 can determine 804 the area of a 3D world (e.g., the 3D world 700) based on a user interaction with a world map. In this example, the media server 130 may receive a user's selection on a world map to preview the environment of a portion of the virtual world and in response, the media server 130 can determine 804 the area of the 3D world corresponding to the portion selected by the user for preview.

The media server 130 generates 806 an aperiodic tiling of an irregular polygon using a machine learning model. The machine learning model may be one or more generative models configured to apply convolutional padding to determine pixel values at a seam between a pair of contacting (e.g., interlocked) irregular polygons. For example, the pattern generation engine 328 provides an einstein, a monotile shape primitive, as an inpainting target for a generative model. The generative model may output a pattern of tiled einsteins including seams having padding values that allow for the pattern to appear seamless.

The media server 130 presents 808 for display at the client device the aperiodic tiling of the irregular polygon in the area of the virtual rendered object. For example, the experience creation engine 326 may present 808 the lotus 420 for display at the media processing device 110, where the lotus 420 is presented with a pattern generated from einstein tiles. In another example, the experience creation engine 326 may present 808 a 3D world generated using 3D einstein tiles having various 3D objects located at the surface of the 3D einstein tiles (e.g., as depicted in FIG. 7).

Additional Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements that are not in direct contact with each other, but yet still co-operate or interact with each other.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Furthermore, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for the described embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope defined in the appended claims.

What is claimed is:

1. A non-transitory computer-readable medium comprising instructions, the instructions, when executed by a computing system, causing the computing system to perform operations including:
   identifying, using activity data corresponding to a user of a client device, a virtual rendered object;
   determining an area of the virtual rendered object, the virtual rendered object configured to have a pattern;
   generating an aperiodic tiling of an irregular polygon using a machine learning model, wherein the machine learning model is configured to apply convolutional padding to determine pixel values at a seam between a pair of interlocked irregular polygons; and
   presenting for display at the client device the aperiodic tiling of the irregular polygon in the area of the virtual rendered object, the aperiodic tiling representative of the pattern.

2. The non-transitory computer readable medium of claim 1, wherein the irregular polygon is an einstein.

3. The non-transitory computer readable medium of claim 1, wherein identifying, using the activity data corresponding to the user of the client device, the virtual rendered object comprises determining a mood score of the user based on biometric data of the user, wherein the virtual rendered object is identified using the mood score.

4. The non-transitory computer readable medium of claim 1, wherein the operations further include:
   modifying, in response to a change in a mood score of the user, a shape of the virtual rendered object; and
   updating, using an inpainting model, the aperiodic tiling to fill the modified shape of the virtual rendered object.

5. The non-transitory computer readable medium of claim 1, wherein the irregular polygon is a first irregular polygon, and wherein the machine learning model is configured to apply convolution padding by:
   identifying a first pair of interlocking sides of the first irregular polygon and a second irregular polygon;
   identifying a second pair of interlocking sides of the first irregular polygon and a third irregular polygon;
   identifying a third pair of interlocking sides of the first irregular polygon and a fourth irregular polygon; and
   determining a plurality of padding values of respective pixels at an edge between the first pair of interlocking sides using a plurality of pixel values at the second pair of interlocking sides and the third pair of interlocking sides.

6. The non-transitory computer readable medium of claim 5, wherein identifying the first pair of interlocking sides comprises:
   assigning a first plurality of weights to a plurality of interlocking pairs of sides of the irregular polygon;
   assigning a second plurality of weights to a plurality of non-interlocking pairs of sides of the irregular polygon; and
   in response to identifying that the first pair of sides are weighed using one of the first plurality of weights, identifying the first pair of interlocking sides.

7. The non-transitory computer readable medium of claim 5, wherein determining the plurality of padding values of respective pixels at the edge between the first pair of interlocking sides comprises determining a linear combination of the plurality of pixel values at the second pair of interlocking sides and the third pair of interlocking sides.

8. The non-transitory computer readable medium of claim 5, wherein the machine learning model is further configured to apply convolutional padding by determining the plurality of padding values along a pre-determined trace around the edge between the first pair of interlocking sides.

9. The non-transitory computer readable medium of claim 1, wherein presenting for display at the client device the aperiodic tiling of the irregular polygon in the area of the virtual rendered object comprises executing a wrapper function configured to apply the aperiodic tiling into a target application.

10. The non-transitory computer readable medium of claim 9, wherein the target application is a game engine.

11. The non-transitory computer readable medium of claim 1, wherein the operations further include:
   generating a three-dimensional (3D) irregular polygon comprising one or more virtual rendered objects on a surface of the 3D irregular polygon; and
   generating a plurality of 3D irregular polygons in the aperiodic pattern, wherein a virtual surface comprises the generated 3D irregular polygons, and the plurality of 3D irregular polygons includes the generated 3D irregular polygon.

12. A system comprising:
   an experience creation engine configured to:
      identify, using activity data corresponding to a user of a client device, a virtual rendered object;
   a pattern generation engine configured to:
      determine an area of the virtual rendered object, the virtual rendered object configured to have a pattern; and
      generate an aperiodic tiling of an irregular polygon using a machine learning model, wherein the machine learning model is configured to apply convolutional padding to determine a seam between a pair of interlocked irregular polygons; and
   the experience creation engine further configured to:
      present for display at the client device the aperiodic tiling of the irregular polygon in the area of the virtual rendered object, the aperiodic tiling representative of the pattern.

13. The system of claim 12, wherein the irregular polygon is an einstein.

14. The system of claim 12, wherein the irregular polygon is a first irregular polygon, and wherein the pattern generation engine is configured to generate the aperiodic tiling of an irregular polygon using the machine learning model by:
   identifying a first pair of interlocking sides of the first irregular polygon and a second irregular polygon;
   identifying a second pair of interlocking sides of the first irregular polygon and a third irregular polygon;
   identifying a third pair of interlocking sides of the first irregular polygon and a fourth irregular polygon; and
   determining a plurality of padding values of respective pixels at an edge between the first pair of interlocking sides using a plurality of pixel values at the second pair of interlocking sides and the third pair of interlocking sides.

15. The system of claim 14, wherein the pattern generation engine is configured to determine the plurality of padding values of respective pixels at the edge between the first pair of interlocking sides by determining a linear combination of the plurality of pixel values at the second pair of interlocking sides and the third pair of interlocking sides.

16. The system of claim 12, wherein the pattern generation engine is further configured to:
   generate a three-dimensional (3D) irregular polygon comprising one or more virtual rendered objects on a surface of the 3D irregular polygon; and generate a plurality of 3D irregular polygons in the aperiodic pattern, wherein a virtual surface comprises the generated 3D irregular polygons, and the plurality of 3D irregular polygons includes the generated 3D irregular polygon.

17. A method comprising:
identifying, using activity data corresponding to a user of a client device, a virtual rendered object;
determining an area of the virtual rendered object, the virtual rendered object configured to have a pattern;
generating an aperiodic tiling of an irregular polygon using a machine learning model, wherein the machine learning model is configured to apply convolutional padding to determine a seam between a pair of interlocked irregular polygons; and
presenting for display at the client device the aperiodic tiling of the irregular polygon in the area of the virtual rendered object, the aperiodic tiling representative of the pattern.

18. The method of claim 17, wherein the irregular polygon is an einstein.

19. The method of claim 17, wherein the irregular polygon is a first irregular polygon, and wherein the machine learning model is configured to apply convolution padding by:
identifying a first pair of interlocking sides of the first irregular polygon and a second irregular polygon;
identifying a second pair of interlocking sides of the first irregular polygon and a third irregular polygon;
identifying a third pair of interlocking sides of the first irregular polygon and a fourth irregular polygon; and
determining a plurality of padding values of respective pixels at an edge between the first pair of interlocking sides using a plurality of pixel values at the second pair of interlocking sides and the third pair of interlocking sides.

20. The method of claim 19, wherein the machine learning model is further configured to apply convolutional padding by determining the plurality of padding values along a pre-determined trace around the edge between the first pair of interlocking sides.

* * * * *